US012718260B2

(12) United States Patent
Loucks et al.

(10) Patent No.: US 12,718,260 B2
(45) Date of Patent: Aug. 25, 2026

(54) COMPUTER-BASED SYSTEMS AND/OR COMPUTING DEVICES CONFIGURED FOR IMPLEMENTING BROWSER EXTENSIONS THAT PROVIDE CONTEXTUALLY RELEVANT INFORMATION TO A USER VIA A GRAPHICAL USER INTERFACE

(71) Applicant: Capital One Services, LLC, McLean, VA (US)

(72) Inventors: Eric Loucks, Tysons, VA (US); Lukiih Cuan, Washington, DC (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/936,585

(22) Filed: Nov. 4, 2024

(65) Prior Publication Data

US 2025/0182154 A1 Jun. 5, 2025

Related U.S. Application Data

(62) Division of application No. 18/166,803, filed on Feb. 9, 2023, now Pat. No. 12,136,101, which is a division (Continued)

(51) Int. Cl.

*G06Q 30/02* (2023.01)
*G06F 8/61* (2018.01)

(Continued)

(52) U.S. Cl.

CPC .......... *G06Q 30/0222* (2013.01); *G06F 8/61* (2013.01); *G06F 16/9577* (2019.01);

(Continued)

(58) Field of Classification Search

CPC .......... G06Q 30/0222; G06Q 30/0224; G06Q 30/0235; G06Q 30/0605; G06Q 30/0633; G06F 16/958; G06F 16/9577; G06F 8/61

See application file for complete search history.

(56) References Cited

U.S. PATENT DOCUMENTS 9,665,547 B1 5/2017 Eidelson et al.
10,140,625 B2 11/2018 Hudson et al.

(Continued)

*Primary Examiner* — Scott C Anderson
(74) *Attorney, Agent, or Firm* — Bookoff McAndrews, PLLC

(57) ABSTRACT

An example method includes identifying, using a browser extension, content of a first webpage of a first website being displayed using a browser. The identifying of the content includes determining a product related to the content of the first webpage and determining that the product has been added to an electronic shopping cart. The method further includes determining a merchant that offers the product for sale and determining, based on a user account associated with the browser extension, a customer reward offered by the merchant and available to the user account. The method further includes determining that the browser has navigated away from the first webpage to a second webpage of a second website. The method further includes modifying the browser to display a graphical user interface element including information about the customer reward and a link configured to navigate the browser back to the first website.

20 Claims, 9 Drawing Sheets

Related U.S. Application Data of application No. 17/090,572, filed on Nov. 5, 2020, now Pat. No. 11,593,828.

(51) Int. Cl.

| | |
|---|---|
| ***G06F 16/957*** | (2019.01) |
| ***G06F 16/958*** | (2019.01) |
| ***G06Q 30/0207*** | (2023.01) |
| ***G06Q 30/0235*** | (2023.01) |
| ***G06Q 30/0601*** | (2023.01) |
| ***G06Q 40/02*** | (2023.01) |
| *G06F 3/0483* | (2013.01) |
| *G06F 3/04842* | (2022.01) |
| *G06F 40/20* | (2020.01) |

(52) U.S. Cl.

CPC ....... *G06F 16/958* (2019.01); *G06Q 30/0224* (2013.01); *G06Q 30/0235* (2013.01); *G06Q 30/0605* (2013.01); *G06Q 30/0633* (2013.01); *G06Q 40/02* (2013.01); *G06F 3/0483* (2013.01); *G06F 3/04842* (2013.01); *G06F 40/20* (2020.01)

(56) References Cited

U.S. PATENT DOCUMENTS

| | | | | |
|---|---|---|---|---|
| 10,417,695 | B1 | 9/2019 | Hiatt et al. | |
| 10,475,061 | B2 | 11/2019 | Givol et al. | |
| 10,521,837 | B1 | 12/2019 | Mossoba et al. | |
| 10,943,241 | B2 * | 3/2021 | Jha | G06Q 30/0254 |
| 2002/0046109 | A1 | 4/2002 | Leonard et al. | |
| 2002/0069194 | A1 * | 6/2002 | Robbins | G06F 16/9532 |
| 2008/0243612 | A1 | 10/2008 | Blinnikka | |
| 2011/0191184 | A1 | 8/2011 | Blackhurst et al. | |
| 2012/0047021 | A1 | 2/2012 | Borchetta et al. | |
| 2012/0158482 | A1 | 6/2012 | Paradise et al. | |
| 2012/0253905 | A1 | 10/2012 | Darragh | |
| 2014/0075014 | A1 * | 3/2014 | Chourey | G06Q 30/02 709/224 |
| 2015/0039982 | A1 | 2/2015 | Bastide et al. | |
| 2015/0193861 | A1 | 7/2015 | Reed et al. | |
| 2015/0206203 | A1 * | 7/2015 | Tietzen | G06Q 30/0231 705/14.3 |
| 2015/0302449 | A1 | 10/2015 | Akbarpour et al. | |
| 2016/0217484 | A9 | 7/2016 | Hudson et al. | |
| 2018/0108054 | A1 | 4/2018 | Doubinski et al. | |
| 2018/0130119 | A1 | 5/2018 | Korac et al. | |
| 2018/0232817 | A1 | 8/2018 | Isaacson et al. | |
| 2019/0026765 | A1 | 1/2019 | Sommer et al. | |
| 2019/0122245 | A1 | 4/2019 | Sahay et al. | |
| 2019/0130433 | A1 | 5/2019 | Tam et al. | |
| 2020/0053071 | A1 | 2/2020 | Akkaraju et al. | |
| 2020/0074446 | A1 | 3/2020 | Isaacson et al. | |
| 2020/0097508 | A1 | 3/2020 | Lovelace | |
| 2022/0138792 | A1 * | 5/2022 | Loucks | G06F 16/9538 705/14.23 |
| 2023/0350967 | A1 * | 11/2023 | Newman | G06F 3/0481 |

* cited by examiner

200
Cloud Platform
Cloud Storage
Cloud Service
Cloud Infrastructure
225
Network
206
Server Device B
Processor
Memory
Network Engine
213
214
216
215
Network Database B
Server Device A
Processor
Memory
Network Engine
207
Network Database A
204
205
217
Client
202n
212n
Client
202b
212b
Client
RAM
Processor
202a
208
210
212a 900
www.merchantwebsiteA.com/productX
602
Browser Extension
902
YOU ARE ELIGIBLE FOR MULTIPLE OFFERS FROM MERCHANT A!!
CLICK HERE TO CLAIM 20% OFF SHOE X
CLICK HERE TO RECEIVE FREE SHIPPING
CLICK HERE TO SEE SPECIAL OFFERS ON PANTS
608
606
SHOE X
Add to Cart 610
0
904
SHOE X Description:
Size
Color
Type
....
612

COMPUTER-BASED SYSTEMS AND/OR COMPUTING DEVICES CONFIGURED FOR IMPLEMENTING BROWSER EXTENSIONS THAT PROVIDE CONTEXTUALLY RELEVANT INFORMATION TO A USER VIA A GRAPHICAL USER INTERFACE

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to improved computer-based platforms/systems, improved computing devices/components and/or improved computing objects configured for one or more novel technological applications of implementing browser extensions that provide contextually relevant information to a user via a graphical user interface.

BACKGROUND OF TECHNOLOGY

A computer network platform/system may include a group of computers (e.g., client devices (e.g., laptops, desktop computers, tablets, smartphone devices, internet of things (IOT) devices, etc.), servers, wireless routers or other networking devices) and other computing hardware devices that are linked together through one or more communication channels to facilitate communication and/or resource-sharing, via one or more specifically programmed graphical user interfaces (GUIs) of the present disclosure.

SUMMARY OF DESCRIBED SUBJECT MATTER

In some embodiments, the present disclosure provides an exemplary technically improved computer-based method that includes at least identifying, by a processor of a computing device, using a browser extension installed in a browser, content of a first webpage of a first website being displayed on a display of the computing device using the browser. The identifying of the content includes determining a product related to the content of the first webpage and determining that the product has been added to an electronic shopping cart. The method further includes determining, by the processor using the browser extension, a merchant that offers the product for sale. The method further includes determining, by the processor using the browser extension, based on a user account associated with the browser extension, a customer reward offered by the merchant and available to a user associated with the user account. The method further includes determining, by the processor using the browser extension, that the browser has navigated away from the first webpage to a second webpage. The second webpage is associated with a second website and the first website is different than the second website. The method further includes modifying, by the processor using the browser extension, after the determination that the browser has navigated away from the first webpage to the second webpage, the display of the computing device to display a graphical user interface element including information about the customer reward and a link configured to, upon selection by a user of the computing device, navigate the browser back to the first website to purchase the product.

In some embodiments, the present disclosure provides an exemplary technically improved computer-based system that includes at least the following components of a display, a memory, and at least one processor coupled to the memory. The processor is configured to identify, using a browser extension installed in a browser, content of a webpage being displayed on the display using the browser. The processor is further configured to determine, using the browser extension, a product related to the content of the webpage and determine, using the browser extension, a merchant that offers the product for sale. The processor is further configured to determine, using the browser extension, based on a user account associated with the browser extension, a customer reward offered by the merchant and available to a user associated with the user account. The processor is further configured to modify, using the browser extension, the display to display a graphical user interface element including information about the customer reward while the webpage is being displayed.

In some embodiments, the present disclosure provides an exemplary technically improved non-transitory computer readable medium having instructions stored thereon that, upon execution by a computing device, cause the computing device to perform operations including identifying, using a browser extension installed in a browser, content of a first webpage being displayed on a display of the computing device using the browser. The operations further include determining, using the browser extension, a product related to the content of the first webpage. The operations further include determining, using the browser extension, a merchant that offers the product for sale. The operations further include determining, using the browser extension, based on a user account associated with the browser extension, a customer reward offered by the merchant and available to a user associated with the user account. The operations further include determining, using the browser extension, that the browser has navigated away from the first webpage to a second webpage. The operations further include modifying, using the browser extension and after the determination that the browser has navigated away from the first webpage to a second webpage, the display of the computing device to display a graphical user interface element including information about the customer reward.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
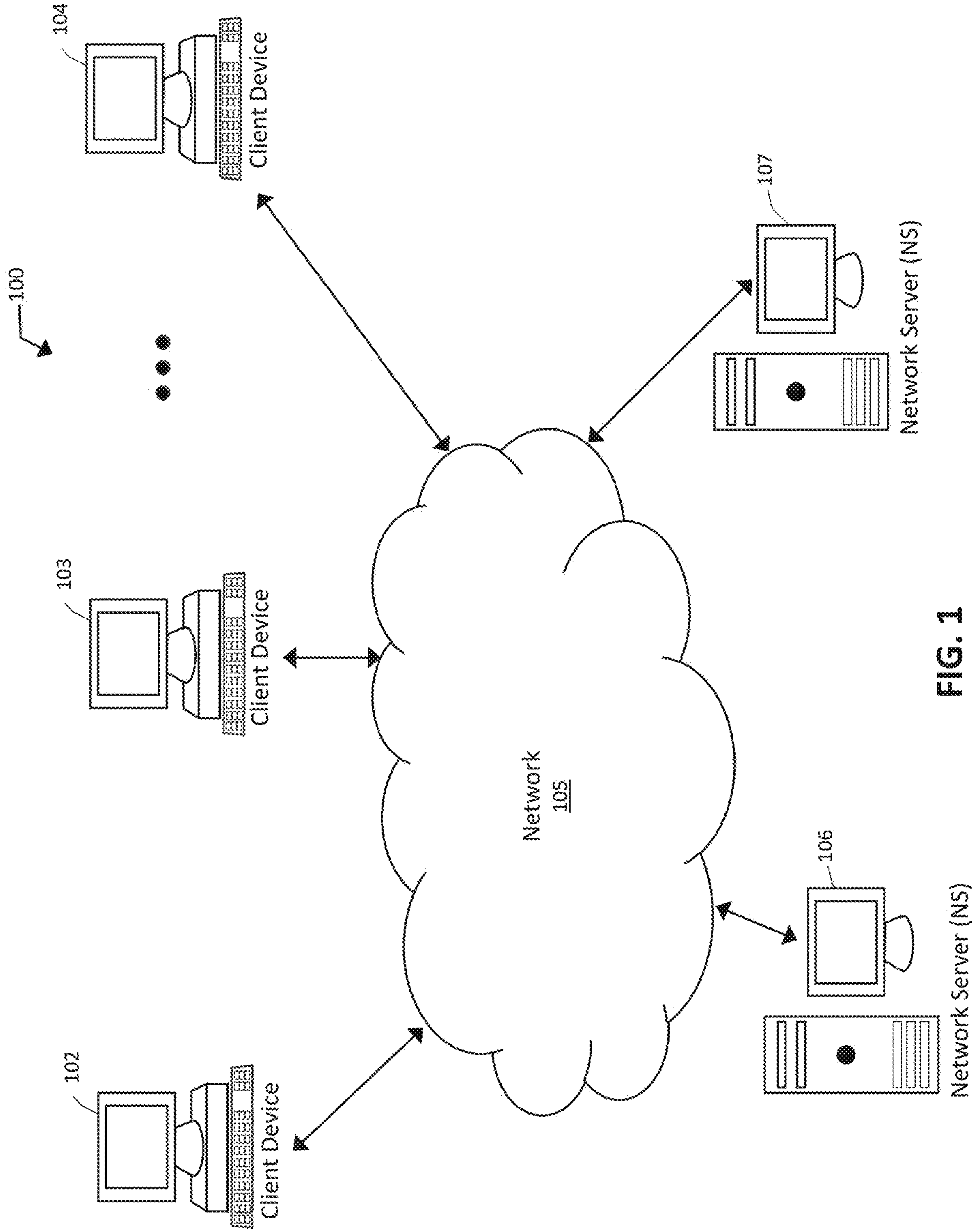
FIG. 1 is a block diagram depicting a computer-based system and platform in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

Described herein are methods, systems, computer readable media, etc. for implementing browser extensions that provide contextually relevant information to a user via a graphical user interface. Various embodiments described herein include technical aspects that reduce the number of pages, websites, or applications a user may have to visit and/or use to learn about or be provided contextually relevant information (e.g., information related to a particular website a user is viewing or product webpage a user is viewing) while using a client electronic device. The various embodiments described herein further include technical aspects that reduce the number of clicks and/or actions taken by users of client devices to learn about or be provided contextually relevant information (e.g., information related to a particular website a user is viewing or product webpage a user is viewing) while using a client electronic device.

In particular, the methods, systems, and computer readable media described herein include a browser extension that may be installed by a user to operate along with a web browser. Web browsers may be used to visit webpages of a website. As used herein, a website refers to a collection of one or more webpages. For example, a webpage may be navigated to by entering a universal resource locator (URL) into a web browser, such as www.capitalone.com. This may cause the browser to display a webpage for the website. However, other URLs may navigate to other pages of a website. For example, a URL may be distinct from www.capitalone.com and display a different webpage but may still be part of the same website as the first webpage. For example, a URL www.capitalone.com/credit-cards/ may navigate to a second webpage of the website. The second webpage may still be considered part of the first website because, for example, the domain name in the URL may indicate a host of the website (e.g., capitalone).

Accordingly, a user may use a client electronic device to operate a browser to navigate to multiple websites and multiple webpages of those websites. The browser extension described herein may interact with the browser on a client electronic device in various ways. The browser extension may determine and analyze content on a webpage and/or website that a user is viewing. The browser extension may access a user's browsing history using the browser. The browser extension may also modify a graphical user interface (GUI) of the client electronic device. For example, the browser extension may modify a portion of a GUI related to the browser itself (e.g., displaying additional information and/or buttons/links in a portion of the browser interface dedicated to the browser extension), and/or may modify a portion of a GUI that is displaying a webpage of a website within the browser (e.g., replacing webpage content with other content).

As described herein, a browser extension may be used to provide information to a user that is using a browser that is contextually relevant to a website or webpage the user is currently viewing and/or has previously viewed. The browser extension may determine websites or webpages the user is viewing and/or has previously viewed in various ways or may determine any information related to those websites or webpages (e.g., company associated with a webpage/website, one or more products associated with a webpage/website, a type of products associated with a webpage/website, etc.). For example, the browser extension may determine content of a webpage being visited by determining text or visual content of a webpage itself being displayed. In additional examples, content of a webpage or website may be determined from data not displayed to a user in the browser, such as webpage or website metadata, browser history of a browser, cookies associated with websites stored in the browser, etc. Content of webpages or websites themselves may be determined through text recognition or analysis, natural language processing (NLP), image recognition, or any other method for determining content of a webpage or website.

By determining the content of a webpage and/or website that a user has viewed or is currently viewing, information that is contextually relevant to those webpages and/or websites may be provided to the user visually via the browser extension. For example, users may have one or more bank accounts or credit cards. A bank or financial institution may issue the credit card or bank account to the user. Banks or financial institutions may partner with retailers to offer their account or credit card holders discounts when the user both shops with the retailer and uses a method of payment associated with the bank or financial institution. Taking advantage of such a discount may, in some instances, require a user to opt into the discount before making the purchase. However, doing so may be tedious or difficult for users. For example, the user may have to learn about the existence of a discount or promotion (e.g., through reading a promotional email), may have to specifically opt into the discount or promotion (e.g., by clicking a link in the promotional email that navigates the user to a website where further steps may be taken to opt into the discount or promotion), may have to navigate to website for the retailer for which the promotion or discount was offered, and/or may have to then remember the promotion or discount to make a properly qualified purchase to receive the promotion or discount at the retailer website. These numerous steps create a significant technical problem for users who wish to opt into such promotions or discounts, as the user may have to use multiple different types of applications (e.g., email applications, web browsers, etc.), may have to sign into multiple accounts (e.g., email, bank or financial institution, retailer), may have to access multiple different websites (e.g., web-based email, bank or financial institution, retailer), and may therefore have to visit numerous different webpages and make numerous different clicks or other user interactions to successfully learn about a discount/promotion, opt into it, and then utilize the discount/promotion by navigating to a retailer website to make a qualified purchase. In various embodiments, the discount/promotion may be offered only for a limited time, so the information provided to the user via the browser extension is even more contextually relevant based on the limited time nature of the offer of the discount/promotion.

The browser extensions described herein provide improved technical solutions for such technical problems by educating users about discounts or promotions for which they may be eligible while they are using a web browser. For example, if a user is currently shopping online for particular product using a web browser, a browser extension may be installed on the web browser that is associated with that user and their account with a bank or financial institution. The browser extension may then determine the content of the webpage or website being visited, determine that the product and/or retailer being viewed is eligible for a discount/promotion, and modify the browser with a GUI element to inform the user about the discount/promotion. The GUI element may further be selectable by the user so that the user may opt into and receive the discount/promotion when the user actually purchases the product eligible for the discount/promotion or any product from an eligible retailer associated with the discount/promotion. In various embodiments, a promotion, discount, or other type of customer reward may be offered specifically based on a user's credit card account type, a user's bank account type, or a user's savings account type. In other words, certain promotions, discounts, customer rewards, etc. may be based on a user's specific account type, financial institution or bank at which the user has an account, etc.

The technical solution of using a browser extension to determine that certain information (e.g., information about a promotion/discount) is relevant to a specific user at a specific time based on context (e.g., content of or related to websites/webpages the user has viewed and/or is viewing) provides several technical advantages. For example, the embodiments described herein reduce the number of clicks, touches, or other interactions taken by a user of a client electronic device to learn about information (e.g., a promotion/discount), take action on such information (e.g., opt into the promotions/discounts to which the user is eligible), and/or make a subsequent action (e.g., purchasing a product from a retailer to which the promotion/discount is applicable). Furthermore, the embodiments described herein reduce the number of computing applications a user may need to navigate to learn about the information (e.g., a promotion/discount), take action on such information (e.g., opt into the promotions/discounts to which the user is eligible), and/or make a subsequent action (e.g., purchasing a product from a retailer to which the promotion/discount is applicable). Accordingly, the amount of time a user may need to spend on a client electronic device to take advantage of such promotions/discounts may also be reduced using the embodiments described herein, which may in turn reduce the overall amount of time a user may spend using a client electronic device.

Reducing the number of user interactions and/or clicks a user may need to make, reducing a number of applications a user may need to use, and/or reducing the amount of time a user may need to spend on a device may all improve the functioning of various electronic devices. For example, reducing the number of user interactions/clicks, reducing the number of applications navigated to, and reducing the amount of time spent on a device may improve the functioning of the user's client electronic device. As a further example, battery life and usage are common concerns for mobile electronic devices. Using the embodiments described herein, persons using a mobile electronic device will use less processing power, thereby preserving battery life. For example, a client electronic device battery may last longer due to decreased time spent actively using the device, fewer applications being active, etc. The client electronic device may also load webpages more quickly if only a single browser and website/webpage is active, rather than multiple applications and/or websites/webpages. In addition, servers or other computing devices that communicate information to the client electronic device may see decreased loads due to users requesting less information (e.g., through less clicks, fewer applications used, fewer webpages/websites visited, etc.) to learn about, opt into, and use a promotion or discount. As such, multiple computing devices may functionally improve based on the systems, methods, and computer readable media described herein. In other words, processing loads, battery demand, etc. on various devices may be reduced using the embodiments described herein, all while improving convenience and ease of use for a user.

The various embodiments described herein therefore solve technological problems with learning about information related to promotions or discounts a user must opt into and subsequently use, by using the technological solutions necessarily rooted in computer technology described herein to improve performance for user devices, server devices, and for any information exchanged between those devices. For example, based on at least the problems and solutions described herein, at least some embodiments of the present disclosure therefore result in improved functioning of mobile electronic devices, network resources, and/or back end servers (including cloud computing resources).

The methods and systems described herein also represent demonstrable technological improvements over prior browser extensions. In other words, the embodiments herein provide for a particular manner of implementing browser extensions that result in the technical benefits described herein as opposed to conventional or known browser extensions.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein, and/or a consumer of data supplied by a data provider. By way of example, and not limitation, the terms "user" or "subscriber" can refer to a person who receives data provided by the data or service provider over the Internet in a browser session or can refer to an automated software application which receives the data and stores or processes the data.

FIG. 1 is a block diagram depicting a computer-based system and platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 100 may be configured to manage a large number of members and/or concurrent transactions, as detailed herein. In some embodiments, the exemplary computer-based system/platform 100 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 1, members 102-104 (e.g., clients) of the exemplary computer-based system/platform 100 may include virtually any computing device capable of receiving and sending a message over a network (e.g., cloud network), such as network 105, to and from another computing device, such as servers 106 and 107, each other, and the like. In some embodiments, the member devices 102-104 may be personal computers, multiprocessor systems, microprocessor-based or programmable consumer electronics, network PCs, and the like. In some embodiments, one or more member devices within member devices 102-104 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 102-104 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 102-104 may include may run one or more applications, such as Internet browsers, mobile applications, voice calls, video games, videoconferencing, and email, among others. In some embodiments, one or more member devices within member devices 102-104 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 102-104 may be specifically programmed by either Java, .Net, QT, C, C++ and/or other suitable programming language. In some embodiments, one or more member devices within member devices 102-104 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 105 may provide network access, data transport and/or other services to any computing device coupled to it. In some embodiments, the exemplary network 105 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 105 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 105 may include and implement, as an alternative or in conjunction with one or more of the above, a WiMAX architecture defined by the WiMAX forum. In some embodiments and, optionally, in combination of any embodiment described above or below, the exemplary network 105 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 105 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 105 may also include mass storage, such as network attached storage (NAS), a storage area network (SAN), a content delivery network (CDN) or other forms of computer or machine readable media.

In some embodiments, the exemplary server 106 or the exemplary server 107 may be a web server (or a series of servers) running a network operating system, examples of which may include but are not limited to Microsoft Windows Server, Novell NetWare, or Linux. In some embodiments, the exemplary server 106 or the exemplary server 107 may be used for and/or provide cloud and/or network computing. Although not shown in FIG. 1, in some embodiments, the exemplary server 106 or the exemplary server 107 may have connections to external systems like email, SMS messaging, text messaging, ad content providers, etc. Any of the features of the exemplary server 106 may be also implemented in the exemplary server 107 and vice versa.

In some embodiments, one or more of the exemplary servers 106 and 107 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 101-104.

In some embodiments and, optionally, in combination of any embodiment described above or below, for example, one or more exemplary computing member devices 102-104, the exemplary server 106, and/or the exemplary server 107 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 2:
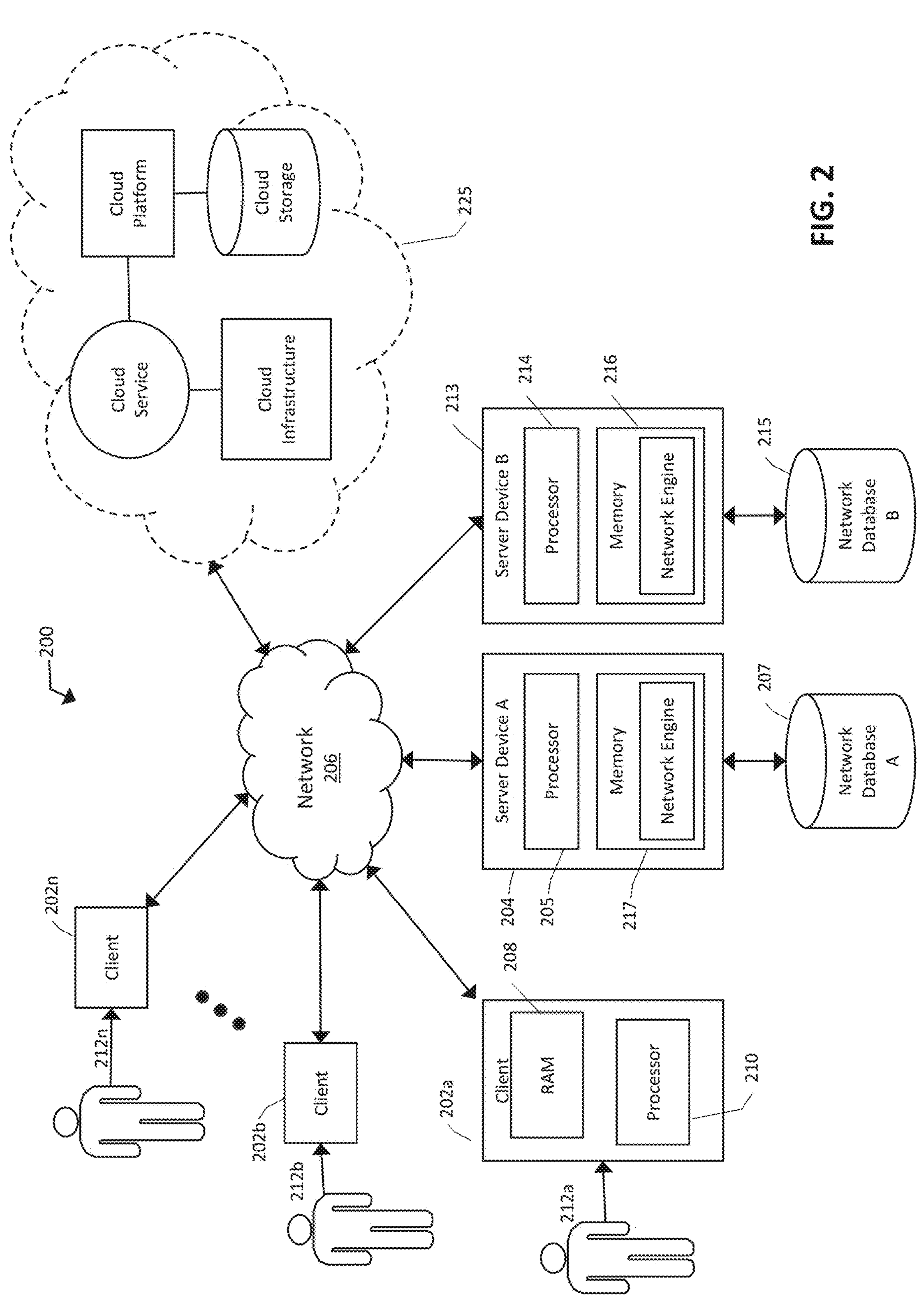
FIG. 2 is a block diagram depicting another computer-based system and platform in accordance with one or more embodiments of the present disclosure.

FIG. 2 depicts a block diagram of another exemplary computer-based system/platform 200 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 202*a*, 202*b* through 202*n* shown each at least includes a computer-readable medium, such as a random-access memory (RAM) 208 coupled to a processor 210 or FLASH memory. In some embodiments, the processor 210 may execute computer-executable program instructions stored in memory 208. In some embodiments, the processor 210 may include a microprocessor, an ASIC, and/or a state machine. In some embodiments, the processor 210 may include, or may be in communication with, media, for example computer-readable media, which stores instructions that, when executed by the processor 210, may cause the processor 210 to perform one or more steps described herein. In some embodiments, examples of computer-readable media may include, but are not limited to, an electronic, optical, magnetic, or other storage or transmission device capable of providing a processor, such as the processor 210 of client 202*a*, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 202*a* through 202*n* may also comprise a number of external or internal devices such as a mouse, a CD-ROM, DVD, a physical or virtual keyboard, a display, or other input or output devices. In some embodiments, examples of member computing devices 202*a* through 202*n* (e.g., clients) may be any type of processor-based platforms that are connected to a network 206 such as, without limitation, personal computers, digital assistants, personal digital assistants, smart phones, pagers, digital tablets, laptop computers, Internet appliances, and other processor-based devices. In some embodiments, member computing devices 202*a* through 202*n* may be specifically programmed with one or more application programs in accordance with one or more principles/methodologies detailed herein. In some embodiments, member computing devices 202*a* through 202*n* may operate on any operating system capable of supporting a browser or browser-enabled application, such as Microsoft™, Windows™, and/or Linux. In some embodiments, member computing devices 202*a* through 202*n* shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 202*a* through 202*n*, users 212*a* through 212*n*, may communicate over the exemplary network 206 with each other and/or with other systems and/or devices coupled to the network 206. As shown in FIG. 2, exemplary server devices 204 and 213 may be also coupled to the network 206. In some embodiments, one or more member computing devices 202*a* through 202*n* may be mobile clients.

In some embodiments, at least one database of exemplary databases 207 and 215 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 3:
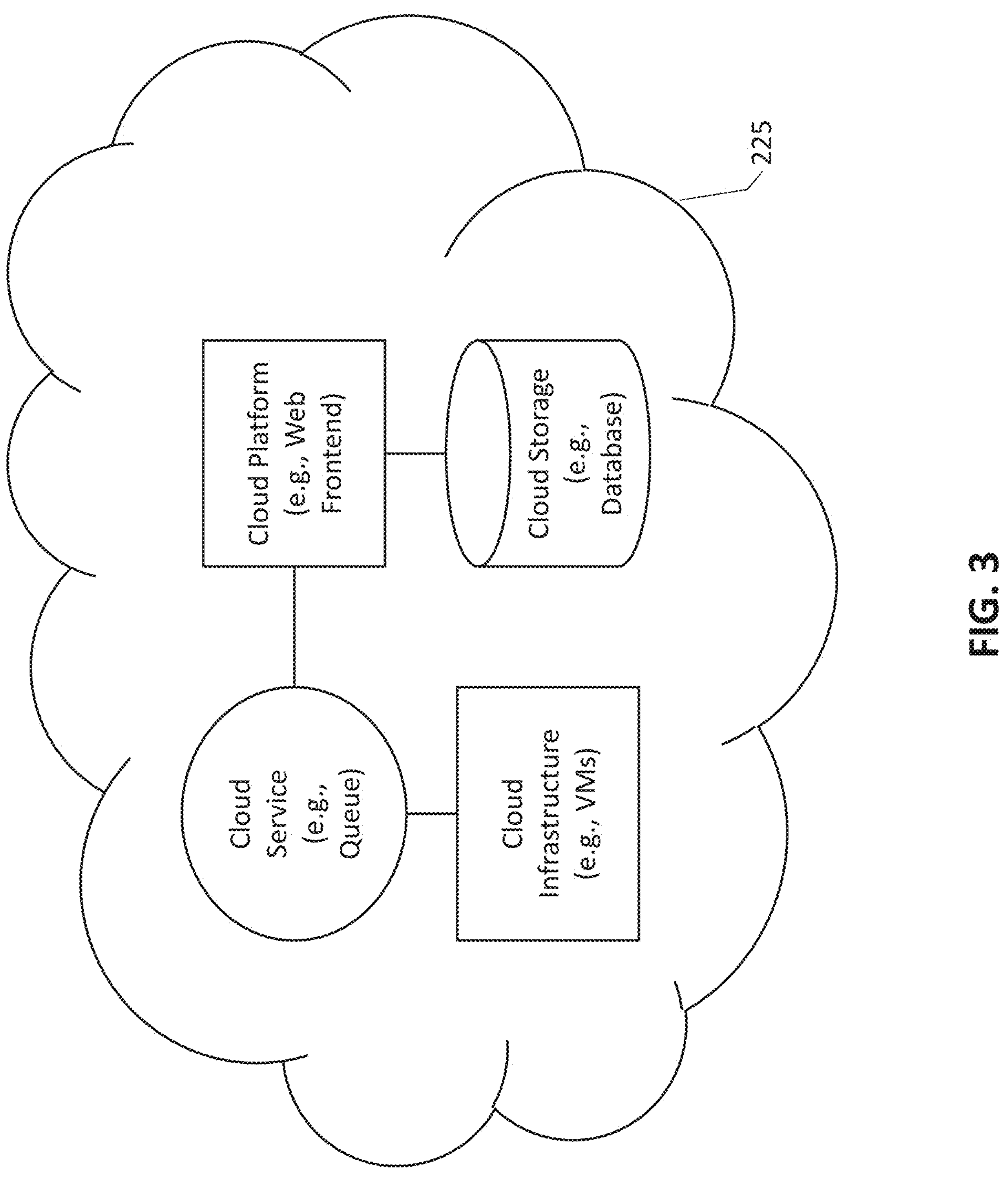
FIGS. 3 and 4 are diagrams illustrating implementations of cloud computing architecture/aspects with respect to which the disclosed technology may be specifically configured to operate, in accordance with one or more embodiments of the present disclosure.

As also shown in FIGS. 2 and 3, some embodiments of the disclosed technology may also include and/or involve one or more cloud components 225, which are shown grouped together in the drawing for sake of illustration, though may be distributed in various ways as known in the art. Cloud components 225 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

Figure 4:
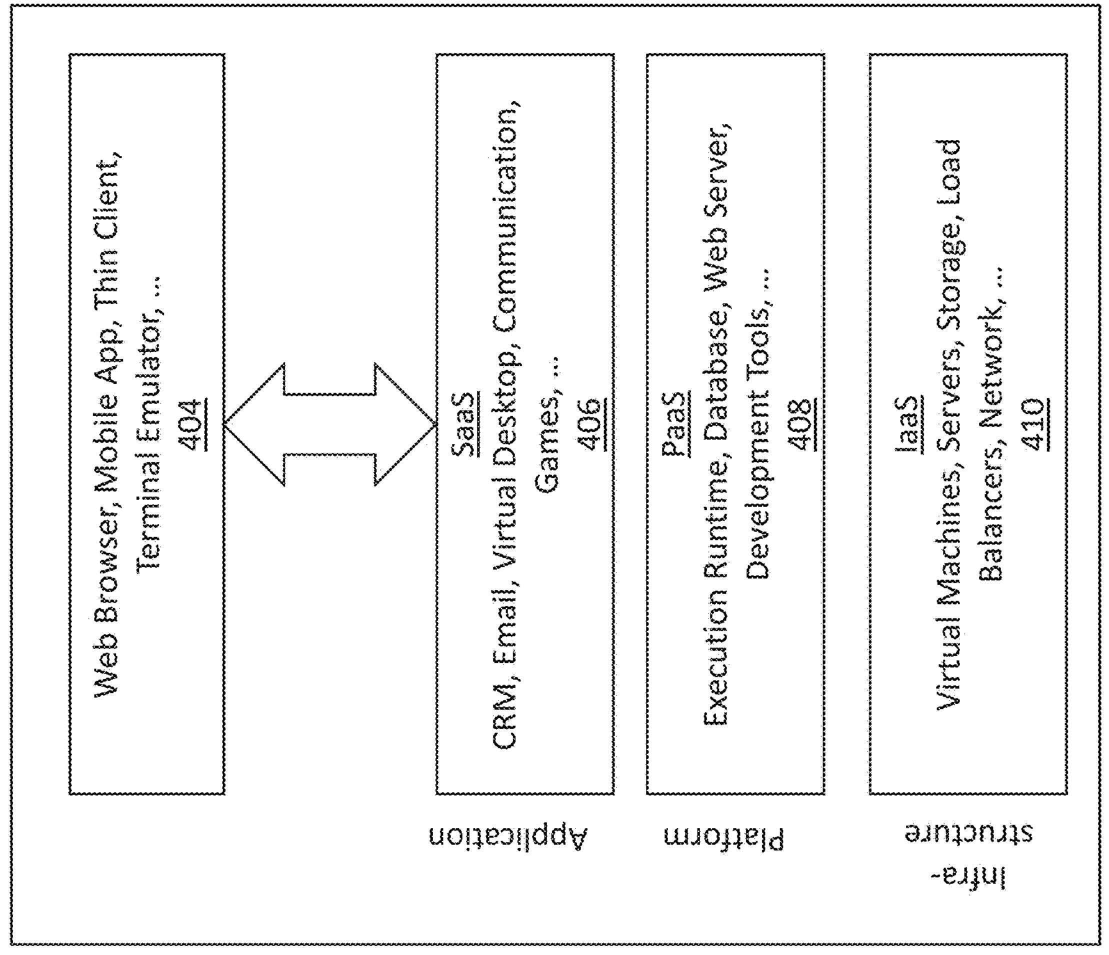

According to some embodiments shown by way of one example in FIG. 4, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 410, platform as a service (PaaS) 408, and/or software as a service (SaaS) 406. FIGS. 3 and 4 illustrate schematics of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate.

In various embodiments, different aspects described with respect to FIGS. 1-4 may be used. For example, users may use any of the client devices 102, 103, 104, or 202*a* through 202*n* to browse the internet, view webpages/websites, install a browser extension, opt into a promotion/discount as described herein, and purchase an item or service that is eligible for the promotion/discount. The client devices may communicate with the server devices 106, 107, 204, or 213; the network databases 207 or 215; and/or the one or more cloud components 225 through the networks 105 or 206. Any of the server devices 106, 107, 204, or 213; the network databases 207 or 215; and/or the one or more cloud components 225 may be associated with one or more of a bank, a financial institution, a retailer, an application used on the client devices, a browser used on the client devices, and/or a browser extension used and/or downloaded to the client devices. As such, the client devices 102, 103, 104, or 202*a* through 202*n* may be in communication with any or all of the other devices shown in FIGS. 1-4 to implement the systems and methods described herein.

Figure 5:
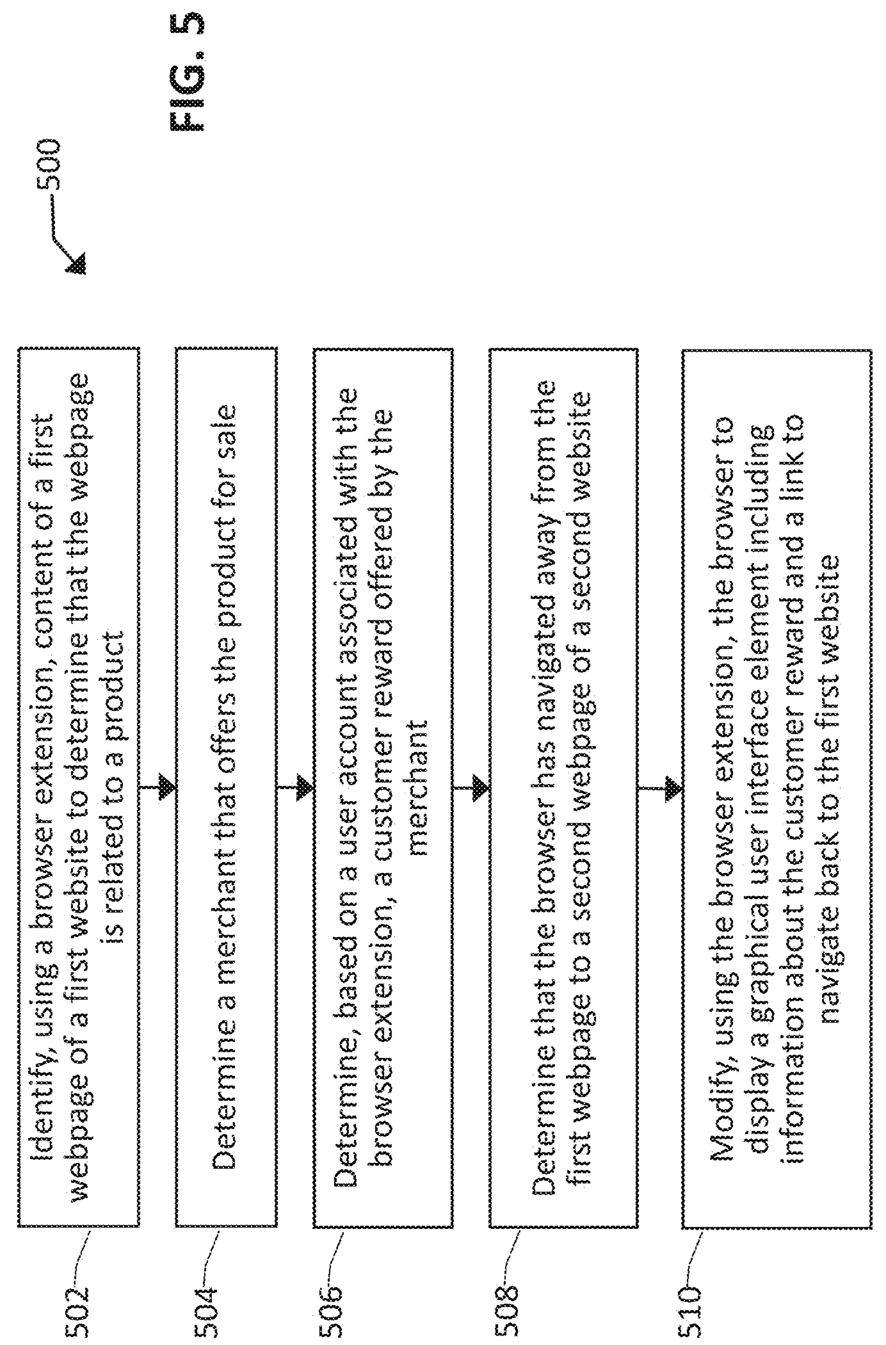
FIG. 5 is a flowchart illustrating a process for implementing browser extensions that provide contextually relevant information to a user via a graphical user interface in accordance with one or more embodiments of the present disclosure.
Figure 6:
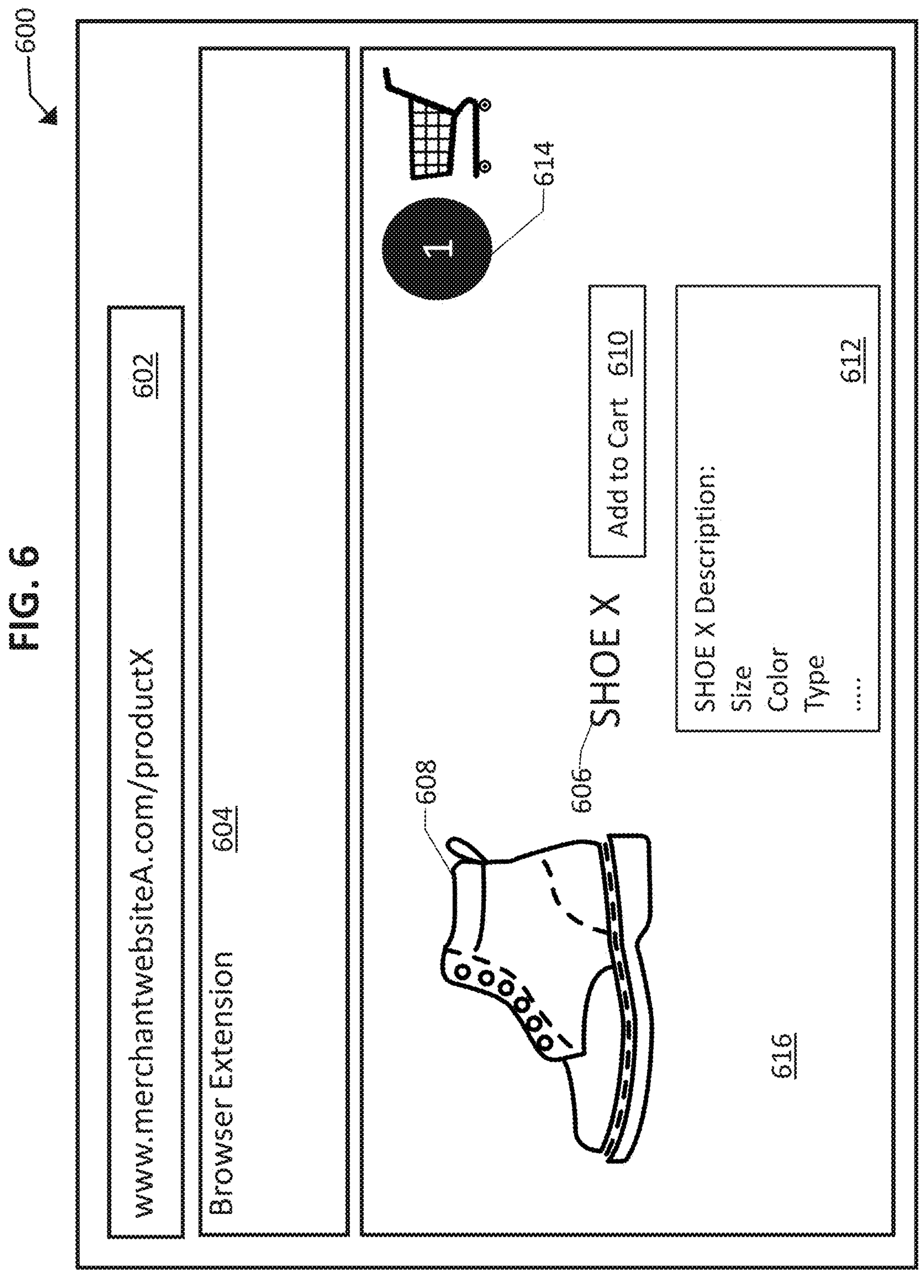
FIG. 6 is a diagram illustrating an example browser interface with a browser extension that provides contextually relevant information to a user via a graphical user interface in accordance with one or more embodiments of the present disclosure.
Figure 7:
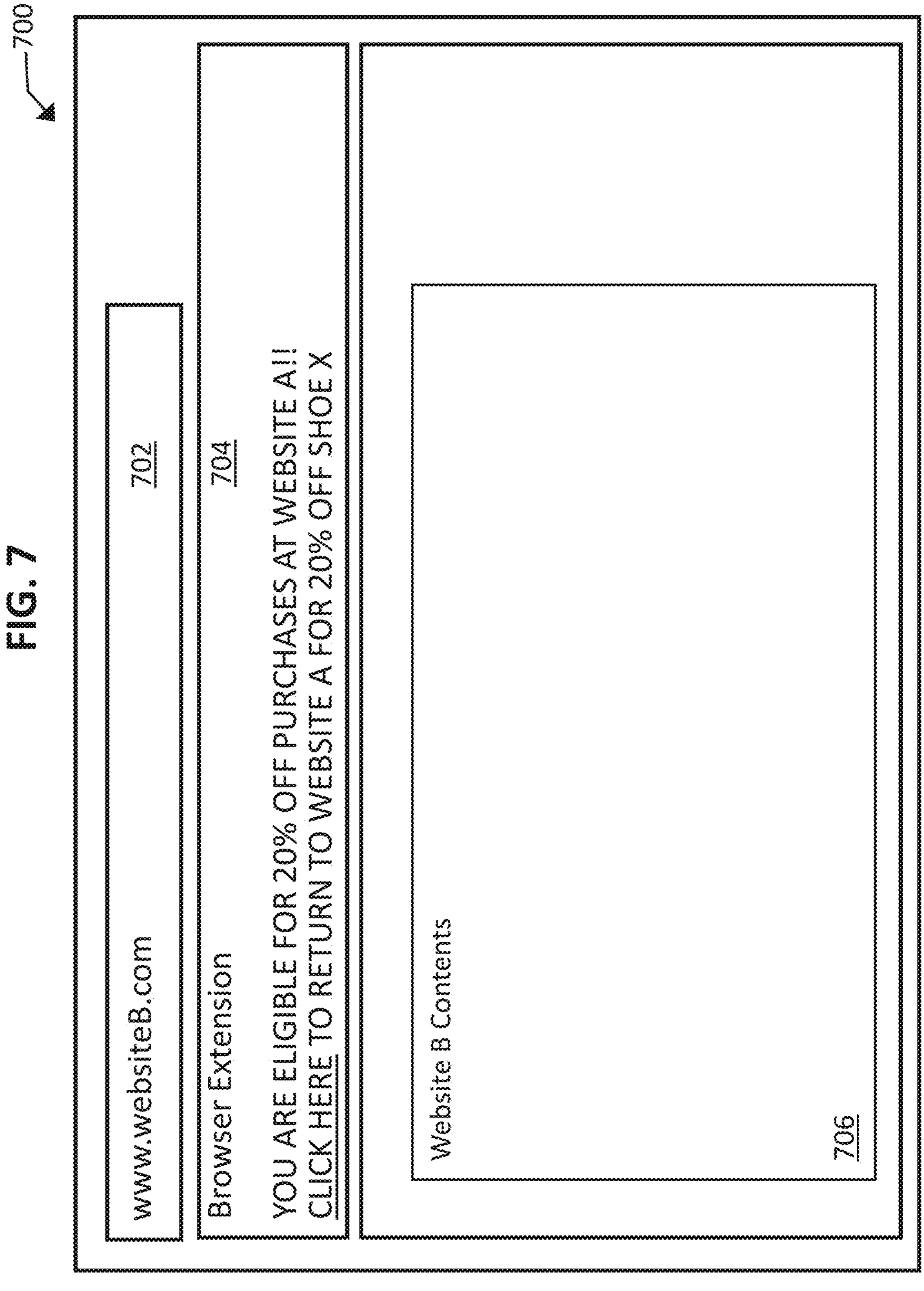
FIG. 7 is a diagram illustrating a second example browser interface with a browser extension that provides contextually relevant information to a user via a graphical user interface in accordance with one or more embodiments of the present disclosure.

FIG. 5 is a flowchart illustrating a process 500 for implementing browser extensions that provide contextually relevant information to a user via a graphical user interface in accordance with one or more embodiments of the present disclosure. The process 500 includes operations that may be performed, for example, using the various components shown in and discussed above with respect to FIGS. 1-4. FIG. 6 is a diagram illustrating an example browser interface 600 with a browser extension that provides contextually relevant information to a user via a graphical user interface in accordance with one or more embodiments of the present disclosure. FIG. 7 is a diagram illustrating a second example browser interface 700 with a browser extension that provides contextually relevant information to a user via a graphical user interface in accordance with one or more embodiments of the present disclosure. FIGS. 5-7 are discussed below together, as the process 500 may be implemented, in some embodiments, to display browser interfaces as shown in or similar to the browser interfaces 600 and/or 700 shown in FIGS. 6 and 7.

At an operation 502 of the process 500, content of a first webpage of a first website is identified by a processor of a computing device using a browser extension installed in a browser. An installed browser extension may request user credentials (e.g., username, password, etc.) associated with a user that may be known to the financial institution or bank with which the user has an account. For example, that user account may be associated with the browser extension based on login credentials provided by the user. The first webpage may be displayed on a display of the computing device that is using the browser. In other words, the browser extension may identify content displayed on a browser running on a user device such as a personal computer, laptop, tablet, mobile phone, etc. The content may be related to a product, a retailer, portion of a website/webpage, etc. Product related content determined by the browser extension may be a specific product, or may be a product category, product type, or product catalog hierarchy information.

The first webpage of the first website being displayed by the browser on the display of the computing device may be the browser interface 600 of FIG. 6. At an operation 504, the merchant offering the product is identified. In various embodiments, the merchant may also be identified based on the content identified from the first webpage and/or the first website visited by the browser.

The browser interface 600 may include a URL 602, where a user may also enter other URLs to navigate to other webpages and/or websites. The browser interface 600 may also include a browser extension GUI element 604, and webpage contents 616. The webpage content 616 may include a product title 606, a product description 612, a product image 608, an add to cart GUI element 610, and an electronic shopping cart GUI element 614. In various embodiments, browser interfaces may have additional, fewer, or different elements than those shown in the browser interfaces of the present application (including the browser interfaces of each of FIGS. 6, 7, and/or 9).

At the operation 502, content of the webpage or website is identified. Such content may include the specific product (e.g., Shoe X) displayed on the webpage, the retailer offering the product for sale (e.g., Merchant A as shown in the URL 602), etc. As described herein, that content may be identified based on the actual content of the webpage/website, the webpage URL, and/or content not visible to the user when visiting the webpage/website (e.g., metadata, cookies, browsing history, etc.).

In the example of FIG. 6, the Shoe X may be added to a cart for purchase by the user, as indicated by the number one shown in the cart GUI element 614. The user may have added Shoe X to the cart by, for example, selecting the add to cart GUI element 610. The browser extension may further identify content related to a cart for a user as they shop on the website/webpage. For example, the browser extension may determine that an item is in the electronic shopping cart and/or may determine the identity of the product in the electronic shopping cart. Based on the content of the first webpage and/or from other sources, the browser extension may determine or otherwise deduce that the product to which the first webpage is directed is offered for sale by the merchant associated with the webpage/website.

At an operation 506, a customer reward offered by the merchant is determined, using the browser extension, to be available to a user associated with a user account used to initially set up the browser extension. The customer reward may be a discount or promotion related to the merchant and/or the product as identified by the browser extension. The browser extension may communicate with a server to determine whether there is an active customer reward that applies to the merchant and/or product. Additionally or alternatively, the browser extension may receive a list of merchant and/or product promotions/discounts to store locally on the client electronic computing devices, so that the browser extension may determine customer rewards for which they are eligible without communicating with a server.

In an operation 508, a determination, using the browser extension, that the browser has navigated away from the first webpage to a second webpage is made. The second webpage may be is associated with a second website, where the first website is different than the second website. In other words, the browser extension may determine that the user has navigated away from the first website. For example, if the user was shopping at Merchant A's website as shown in the browser interface 600 of FIG. 6, the user may have navigated away to a Website B as shown in the browser interface 700 of FIG. 7.

At an operation 510, after the determination that the browser has navigated away from the first webpage to the second webpage, the display of the computing device is modified using the browser extension to display a GUI element comprising information about the customer reward and a link configured to, upon selection by a user of the computing device, navigate the browser back to the first website to purchase the product. In other words, the browser extension may be configured to determine that a user has navigated away from a product or retailer webpage/website and display a GUI element configured to provide them with contextually relevant information about a reward (e.g., discount, promotion) and to lead them back to purchase the product. In other embodiments, such as those discussed with respect to FIGS. 8 and 9 below, a GUI element related to a customer reward may be displayed while a user is on the product webpage or retailer website. However, in this example, the GUI element related to the customer reward is displayed only after the user has navigated their browser away from the retailer website.

In particular, in the browser interface 700, a URL 702 is displayed showing that the user has navigated to Website B that is different from the website related to Merchant A. Webpage contents 706 are also displayed in the browser interface 700. In the browser extension GUI element 704, aspects of the browser extension display have changed as compared to the browser extension GUI element 604 of FIG. 6. In particular, the browser extension GUI element 704 now shows contextually relevant information about the Product A the user just navigated away from, including a discount the user may receive on Product A if they navigate back to the retailer website. The browser extension GUI element 704 may further include a link or other selectable element for automatically navigating the user back to the retailer's website to purchase Product A.

If the user selects the link displayed in the browser extension GUI element 704, that may be treated as the user opting into the customer reward, promotion, or discount. In other embodiments, the user may have to select an additional GUI element or take other steps to properly opt into the customer reward, promotion, or discount.

In various embodiments, the browser extension GUI element 704 may be displayed with contextually relevant information in close temporal proximity to the user visiting Merchant A's website or may be displayed after a predetermined amount of time or predetermined number of other websites and/or webpages visited. In other words, the user may be provided with contextually relevant information related to their visit to Merchant A's website soon after navigating away from the website or at a time later after the user has navigated away from Merchant A's website. The browser extension GUI element 704 may also be displayed after the user has ended an internet browsing session and started a new internet browsing session to remind them of what they were shopping for and that there is a discount and/or promotion available.

In various embodiments, the browser extension GUI element 704 may be displayed only if the user has added the Product X to their electronic shopping cart and subsequently navigated away from Merchant A's website. Such an occurrence may be referred to herein as the user abandoning an item in their electronic shopping cart. In such embodiments, modifying the display of a browser interface may help convince a user to go back to Merchant A's website to actually purchase the Product X they have added to their electronic shopping cart and subsequently abandoned.

The way in which the browser interface is modified to inform the user of contextually relevant information may also vary in various embodiments. For example, instead of modifying the browser extension GUI element 604 or 704

(e.g., a browser extension specific portion of the browser interface), the browser extension may modify a portion of a currently displayed webpage (e.g., portions of the webpage contents 616 and/or the webpage contents 706). For example, the browser extension may change a portion of a webpage, overlay content over the webpage, etc. In another example, the browser extension may modify a display of a computing device by causing a pop-up window including promotion, discount, or other customer reward information to be displayed. Accordingly, the browser extension may modify a computing device's display in different ways to provide contextually relevant information to a user.

In some embodiments, selection of a link displayed as part of a modification to a display made by the browser extension may navigate the user back to an original webpage where the user previously was (e.g., the browser interface 600). In another embodiment, the selection of the link may navigate the user's browser to a different webpage of the original website, such as a checkout page of the first website for purchasing any items previously added to an electronic shopping cart by the user. At the checkout page, the product abandoned in the electronic shopping cart may be purchased, and a discount, promotion, or other customer reward applied to the purchase may also be displayed. That discount, promotion, or other customer reward may be automatically applied to a purchase price of the product on the checkout page, or otherwise automatically be displayed on the webpage if the discount, promotion, or other customer reward does not relate directly to the purchase price of the product.

Figure 8:
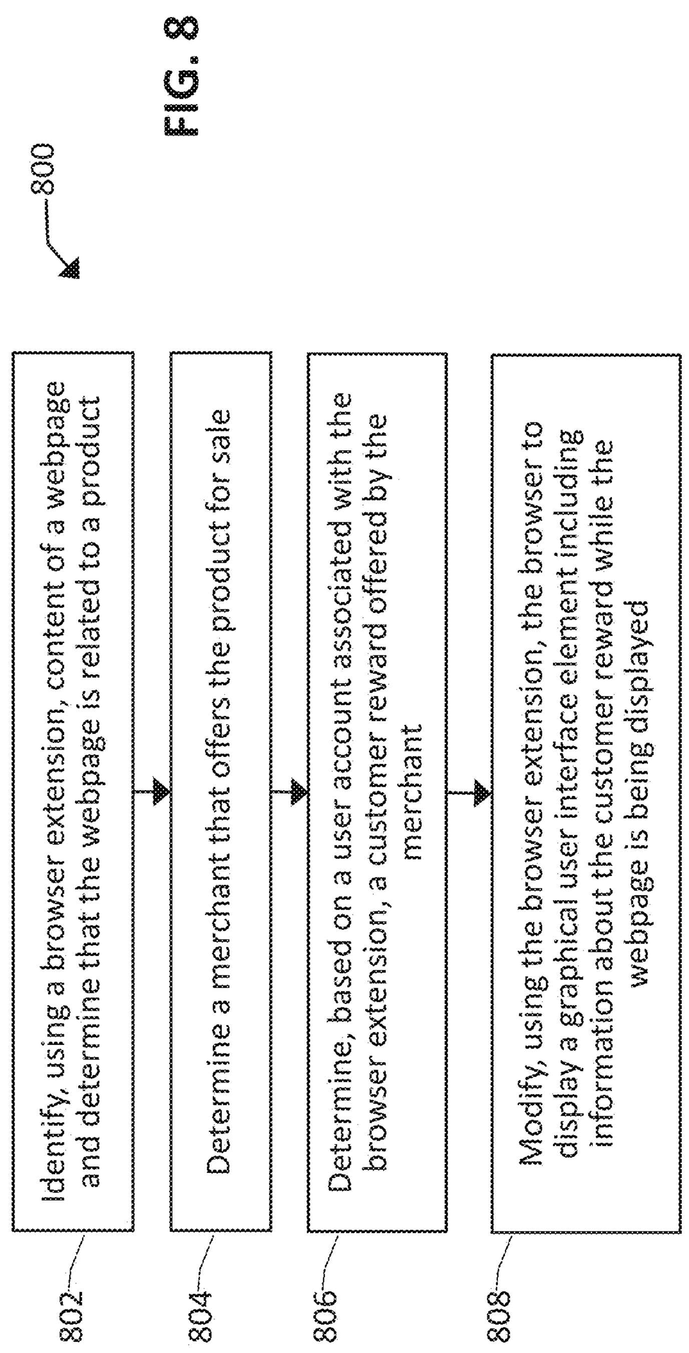
FIG. 8 is a flowchart illustrating a second process for implementing browser extensions that provide contextually relevant information to a user via a graphical user interface in accordance with one or more embodiments of the present disclosure.
Figure 9:
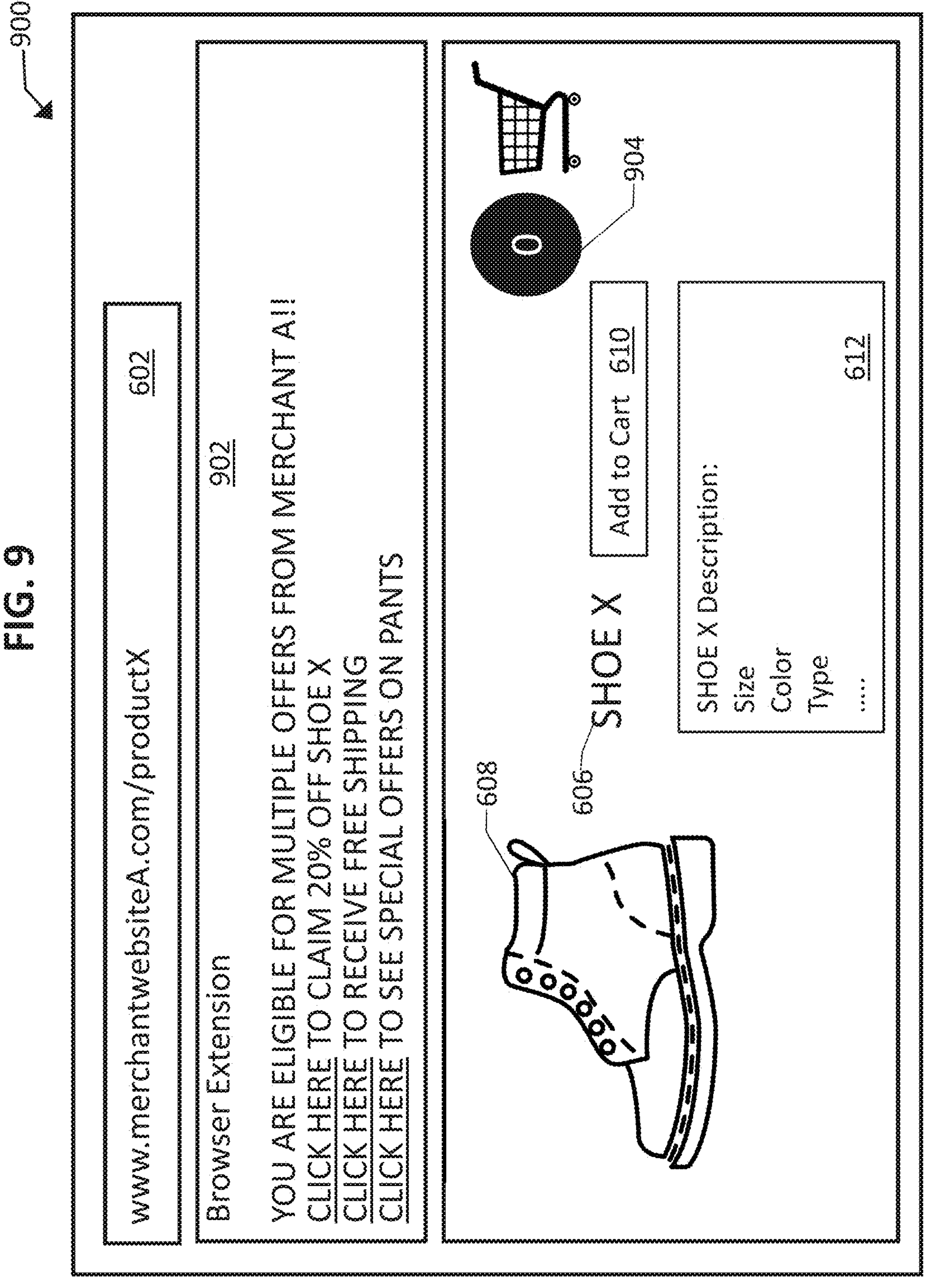
FIG. 9 is a diagram illustrating a third example browser interface with a browser extension that provides contextually relevant information to a user via a graphical user interface in accordance with one or more embodiments of the present disclosure.

FIG. 8 is a flowchart illustrating a second process 800 for implementing browser extensions that provide contextually relevant information to a user via a graphical user interface in accordance with one or more embodiments of the present disclosure. FIG. 9 is a diagram illustrating a third example browser interface 900 with a browser extension that provides contextually relevant information to a user via a graphical user interface in accordance with one or more embodiments of the present disclosure. FIGS. 8 and 9 are discussed below together, as the process 800 may be implemented, in some embodiments, to display browser interfaces as shown in or similar to the browser interfaces 600 and/or 700 shown in FIGS. 6 and 7. FIG. 9 shows an example of modifying a browser interface to indicate a promotion, discount, or customer reward while the user is currently on a webpage related to that product.

The examples of FIGS. 8 and 9 is different from the examples shown in and described with respect to FIGS. 5-7, where the browser extension modified the display only after the user navigated away from the product webpage. In particular, the browser interface 900 includes similar elements to the browser interface 600, except that a browser extension GUI 902 displays multiple offers, promotions, discounts, customer rewards, etc. related to the product displayed on the webpage and/or related to the retailer the website is related to. In addition, the electronic shopping cart GUI 904 does not have a product added to it.

At an operation 802, content of a webpage being displayed on the display of computing device is identified using a browser extension installed in a browser. The content identified may indicate a product being displayed on the webpage or otherwise related to the webpage. Such content may be identified similar to how content is identified in the operation 502 of FIG. 5 as described above.

At an operation 804, the browser extension further determines that a merchant is offering the identified product for sale. Such a merchant may be identified similar to how a merchant is identified in the operation 504 of FIG. 5 as described above.

At an operation 806, the browser extension determines, based on a user account associated with the browser extension, a customer reward (e.g., a discount, a promotion) offered by the merchant and available to a user associated with the user account. Such a determination of an available customer reward may be similar to the determination of a customer reward in the operation 506 of FIG. 5 as described above.

At an operation 808, the browser extension modifies the display of the computing device to display a GUI element including information about the customer reward while the webpage is being displayed. In other words, as shown in the example of FIG. 9, the browser extension GUI element 902 may be used to modify a display of a browser to provide information to a user about customer rewards, discounts, promotions, etc. related to a product being viewed or a merchant that sells such a product.

In various embodiments, a browser extension may identify content of multiple webpages and/or websites visited by a user over time. In this way, the information gathered by the browser extension may be used to determine an area or product of interest of the user's. In various embodiments, the browser extension may not display rewards, promotions, customer rewards, etc. related to a product or retailer until the user has visited a predetermined number of webpages or websites associated with the product and/or retailer. In this way, the browser extension may be configured to provide contextually relevant information that is of a higher level of interest to user. In other words, promotion, discount, customer reward, etc. information may only be provided to a user once they have demonstrated a threshold level of interest in a particular product and/or retailer. As such, a browser extension, in various embodiments, may be modified only after determining that more than one webpage or website has been visited relating to a product or retailer (or that some other predetermined threshold of interest has been met). A predetermined threshold of interest may also relate to time spent viewing webpages and/or websites relating to a particular product, product type, and/or retailer. In various embodiments, a predetermined threshold of interest may also relate to a number of interactions (e.g., scrolls, clicks, etc.) with webpages and/or websites relating to a particular product, product type, and/or retailer. A level of interest may also be associated with a number of webpages visited associated with a particular website, a number of webpages visited associated with a product, scrolling time spent on a first webpage or a plurality of webpages of the website, an amount of time a tab of a browser is open that displays the first webpage when that tab is active, or any other method for determining a level of interest of a user and whether that level of interest exceeds a predetermined threshold level. Accordingly, the browser extension may determine areas of interest and/or levels of interest of a user over time and/or over multiple browsing sessions to provide more contextually relevant information to a user.

In various embodiments, a webpage may be related to a product without being related to a retailer that sells a product. For example, a webpage may be blog posting relating to a product or a review website on which a product review webpage may be viewed. In such instances, the browser extension may still identify the product related to the webpage being viewed. In such an embodiment, the browser may be modified by the browser extension as shown in FIG. 7 or 9 to provide information about discounts, promotions, or other rewards relating to the product and/or a retailer that sells the product. In various embodiments, such a modification to the display may also include a link (such as the link shown in FIG. 9) to navigate the user to a website at which the product may be purchased. In other words, the embodiments described herein may be applicable to websites and/or webpages that are not related to retailer.

In various embodiments, a user may navigate to first webpage that is related to a first retailer. That first webpage may be related to a particular product, but the user may not be eligible for any promotions, discounts, customer rewards, etc. related to the first retailer. However, the browser extensions as described herein may determine that the particular product is sold by a second retailer. The browser extensions may then modify a display to include a link to a second website of the second retailer where the particular product may be purchased. In various embodiments, the modification may further include information related to the specific discount, promotion, or customer reward offered, including the price the particular product would be if the user purchased it from the second retailer instead of the first retailer.

At least some aspects of the present disclosure will now be described with reference to the following numbered clauses.

1. A method comprising:
   identifying, by a processor of a computing device, using a browser extension installed in a browser, content of a first webpage of a first website being displayed on a display of the computing device using the browser, wherein the identifying of the content comprises:
      determining a product related to the content of the first webpage, and
      determining that the product has been added to an electronic shopping cart;
   determining, by the processor using the browser extension, a merchant that offers the product for sale;
   determining, by the processor using the browser extension, based on a user account associated with the browser extension, a customer reward offered by the merchant and available to a user associated with the user account;
   determining, by the processor using the browser extension, that the browser has navigated away from the first webpage to a second webpage, wherein:
      the second webpage is associated with a second website, and
      the first website is different than the second website; and
   modifying, by the processor using the browser extension, after the determination that the browser has navigated away from the first webpage to the second webpage, the display of the computing device to display a graphical user interface element comprising information about the customer reward and a link configured to, upon selection by a user of the computing device, navigate the browser back to the first website to purchase the product.
2. The method of clause 1, further comprising installing the browser extension in the browser and associating, by the processor, the user account with the browser extension based on login credentials provided by the user.
3. The method of clause 1, wherein the determining of the product related to the content of the first webpage and determining the merchant that offers the product for sale each comprises performing, by the processor using the browser extension, natural language processing on the content of the first webpage.
4. The method of clause 1, wherein the product determined to be related to the content of the first webpage comprises a category of products or a specific product.
5. The method of clause 1, wherein the customer reward is offered for a limited time.
6. The method of clause 1, wherein the display information about the customer reward comprises a display element for opting into the customer reward.
7. The method of clause 6, further comprising receiving, by the processor using the browser extension, a user input indicative of an interaction with the display element to opt in to the customer reward.
8. The method of clause 1, wherein the graphical user interface element is displayed while the browser is displaying the second webpage.
9. The method of clause 1, further comprising receiving, by the processor using the browser extension, a user input indicative of a selection of the link.
10. The method of clause 9, further comprising navigating, by the processor, the browser to the first website in response to the user input indicative of the selection of the link.
11. The method of clause 10, wherein the navigating of the browser back to the first website comprises navigating the browser to a third webpage, the third webpage comprising a checkout page of the first website, wherein:
   the product is available for purchase from the merchant via the checkout page,
   the customer reward comprises a discount on the product, and the discount is automatically applied to a purchase price of the product on the checkout page.
12. A system comprising:
   a memory;
   a display; and
   at least one processor coupled to the memory, the processor configured to:
      identify, using a browser extension installed in a browser, content of a webpage being displayed on the display using the browser;
      determine, using the browser extension, a product related to the content of the webpage;
      determine, using the browser extension, a merchant that offers the product for sale;
      determine, using the browser extension, based on a user account associated with the browser extension, a customer reward offered by the merchant and available to a user associated with the user account; and
      modify, using the browser extension, the display to display a graphical user interface element comprising information about the customer reward while the webpage is being displayed.
13. The system of clause 12, wherein the modification of the display comprises adding an overlay to the webpage being displayed comprising the information about the customer reward.
14. The system of clause 12, wherein the modification of the display comprises modifying the webpage itself to display the information about the customer reward.
15. The system of clause 12, wherein the webpage is a first webpage of a first website and the content is a first content, and the processor is further configured to:
   identify, using the browser extension, second content of a second webpage of a second website being displayed on the display using the browser after the first webpage is displayed; and determine, using the browser extension, that the second content of the second webpage is also related to the product, wherein the display is modified to display the information about the customer reward only after determining that both the first webpage and the second webpage are related to the product.

16. The system of clause 12, wherein the customer reward is offered to the user based on a user credit card account type, a user bank account type, or a user savings account type.

17. A non-transitory computer readable medium having instructions stored thereon that, upon execution by a computing device, cause the computing device to perform operations comprising:

identifying, using a browser extension installed in a browser, content of a first webpage being displayed on a display of the computing device using the browser;

determining, using the browser extension, a product related to the content of the first webpage;

determining, using the browser extension, a merchant that offers the product for sale;

determining, using the browser extension, based on a user account associated with the browser extension, a customer reward offered by the merchant and available to a user associated with the user account;

determining, using the browser extension, that the browser has navigated away from the first webpage to a second webpage; and modifying, using the browser extension and after the determination that the browser has navigated away from the first webpage to a second webpage, the display of the computing device to display a graphical user interface element comprising information about the customer reward.

18. The non-transitory computer readable medium of clause 17, wherein the first webpage is part of a website that provides product reviews and does not offer the product for sale.

19. The non-transitory computer readable medium of clause 17, wherein the instructions further cause the computing device to perform operations comprising: determining a level of interest in the product, wherein the display of the computing device is only modified to display the information about the customer reward after determining that the level of interest is above a predetermined threshold.

20. The non-transitory computer readable medium of clause 19, wherein the level of interest is determined based on at least one of a first time spent viewing the first webpage, a second time spent viewing a website associated with the first webpage, a number of webpages visited associated with the website, a number of webpages visited associated with the product, scrolling time spent on the first webpage or a plurality of webpages of the website, or an amount of time a tab of a browser is open that displays the first webpage when active.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., FIGS. 3 and 4) and cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) Linux™, (2) Microsoft Windows™, (3) OS X (Mac OS), (4) Solaris™, (5) UNIX™ (6) VMWare™, (7) Android™, (8) Java Platforms™, (9) Open Web Platform, (10) Kubernetes or other suitable computer platforms. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, the terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A method, comprising:

identifying, via a browser extension installed in a browser, first content of a first webpage of a first website being displayed on a display via the browser;

determining, via the browser extension, a product based on the first content of the first webpage;

determining, via the browser extension, a user has visited a second webpage related to the product, wherein the second webpage has been determined to be related to the product based on second content of the second webpage of a second website being displayed on the display via the browser;

determining, via the browser extension, a merchant that offers the product for sale;

determining, via the browser extension, a customer reward offered by the merchant and applicable to the sale of the product, the customer reward determined from a plurality of customer rewards that have been stored locally on a user device accessible by the browser extension;

determining, via the browser extension, whether the user associated with the browser has at least a threshold level of interest associated with the product based on the determination that the user has visited the first webpage and the second webpage related to the product; and modifying, via the browser extension, the display of the browser to include a graphical user interface (GUI) element, the GUI element including an interface element selectable to activate the customer reward while the first webpage is being displayed, wherein the display is modified to display the interface element only after determining (i) both the first webpage and the second webpage are associated with the product and (ii) the user has visited the second webpage related to the product and that the threshold level of interest has been met or exceeded.

2. The method of claim 1, further comprising:

collecting, via the browser extension, contextual data associated with the user; and storing, via a data storage, the contextual data.

3. The method of claim 2, wherein the contextual data includes one or more of a number of visits to the first webpage over a period of time, a number of visits to at least one other webpage associated with the product, a number of visits to at least one other website associated with the product, or a length of time the first webpage has remained active.

4. The method of claim 3, wherein the at least one other webpage or the at least one other website are different from the first webpage and the first website.

5. The method of claim 3, wherein determining whether the threshold level of interest associated with the product is met or exceeded is based on analysis of the contextual data.

6. The method of claim 1, further comprising:

determining, via the browser extension, an area of interest based on contextual data associated with the user; and determining, via the browser extension, the product based on the first content of the first webpage and the determined area of interest.

7. The method of claim 1, wherein the browser extension is configured to, upon determining that the threshold level of interest has not been met or exceeded, refrain from modifying the display.

8. The method of claim 1, wherein, the browser extension is configured to, upon determining that the threshold level of interest has not been met or exceeded:

collect further contextual data associated with the user; and store, via a data storage, the further contextual data.

9. The method of claim 1, wherein modifying the display comprises adding an overlay to the first webpage being displayed comprising the interface element selectable to activate the customer reward.

10. A system, the system comprising:

at least one memory storing instructions; and at least one processor operatively connected to the at least one memory, and configured to execute the instructions to perform operations, the operations including:

identifying, via a browser extension installed in a browser, first content of a first webpage of a first website being displayed on a display via the browser;

determining, via the browser extension, a product based on the first content of the first webpage;

determining, via the browser extension, a user has visited a second webpage related to the product, wherein the second webpage has been determined to be related to the product based on second content of the second webpage of a second website being displayed on the display via the browser;

determining, via the browser extension, a merchant that offers the product for sale;

determining, via the browser extension, a customer reward offered by the merchant and applicable to the sale of the product;

determining, via the browser extension, whether the user associated with the browser has at least a threshold level of interest associated with the product based on one or both of (i) a first amount of time a first tab that displays the first webpage is open or (ii) a second amount of time a second tab that displays the second webpage is open; and modifying, via the browser extension, the display of the browser to include a graphical user interface (GUI) element, the GUI element including an interface element selectable to activate the customer reward while the first webpage is being displayed, wherein the display is modified to display the interface element only after determining (i) both the first webpage and the second webpage are associated with the product and (ii) the user has visited the second webpage related to the product and that the threshold level of interest has been met or exceeded.

11. The system of claim 10, the operations further comprising:

collecting, via the browser extension, contextual data associated with the user; and storing, via a data storage, the contextual data.

12. The system of claim 11, wherein the contextual data includes one or more of a number of visits to the first webpage over a period of time, a number of visits to at least one other webpage associated with the product, a number of visits to at least one other website associated with the product, or a length of time the first webpage has remained active.

13. The system of claim 12, wherein the at least one other webpage or the at least one other website are different from the first webpage and the first website.

14. The system of claim 12, wherein determining whether the threshold level of interest associated with the product is met or exceeded is based on analysis of the contextual data.

15. The system of claim 10, the operations further comprising:

determining, via the browser extension, an area of interest based on contextual data associated with the user; and determining, via the browser extension, the product based on the first content of the first webpage and the determined area of interest.

16. The system of claim 10, wherein the browser extension is configured to, upon determining that the threshold level of interest has not been met or exceeded, refrain from modifying the display.

17. The system of claim 10, wherein, the browser extension is configured to, upon determining that the threshold level of interest has not been met or exceeded:

collect further contextual data associated with the user; and store, via a data storage, the further contextual data.

18. The system of claim 10, wherein modifying the display comprises adding an overlay to the first webpage being displayed comprising the interface element selectable to activate the customer reward.

19. A method, the method comprising:

collecting, via a browser extension installed in a browser, contextual data associated with a product;

storing, via a data storage, the contextual data;

identifying, via the browser extension installed in a browser, first content of a first webpage of a first website being displayed on a display via the browser;

determining, via the browser extension, a product based on the first content of the first webpage;

determining, via the browser extension, a user has visited a second webpage related to the product, wherein the second webpage has been determined to be related to the product based on second content of the second webpage of a second website being displayed on the display via the browser;

determining, via the browser extension, a merchant that offers the product for sale;

determining, via the browser extension, a customer reward offered by the merchant and applicable to the sale of the product;

determining, via the browser extension, whether the user associated with the browser has at least a threshold level of interest associated with the product based on the determination that the user has visited the first webpage and the second webpage related to the product and the contextual data, wherein the contextual data includes one or more of a number of visits to the first webpage over a first period of time, a number of visits to the second webpage over a second period of time, a number of visits to at least one other webpage associated with the product, a number of visits to at least one other website associated with the product, or a length of time the first webpage has remained active; and modifying, via the browser extension, the display of the browser to include a graphical user interface (GUI) element, the GUI element including an interface element selectable to activate the customer reward while the first webpage is being displayed, wherein the display is modified to display the interface element only after determining (i) both the first webpage and the second webpage are associated with the product and (ii) the user has visited the second webpage related to the product and that the threshold level of interest has been met or exceeded.

20. The method of claim 19, wherein modifying the display comprises adding an overlay to the first webpage being displayed comprising the interface element selectable to activate the customer reward.

* * * * *